United States Patent
Weimer et al.

(10) Patent No.: US 7,258,455 B2
(45) Date of Patent: Aug. 21, 2007

(54) INTERIOR MIRROR WITH A DRIVE MECHANISM FOR ADJUSTING A WEDGE MIRROR GLASS

(75) Inventors: Helmut Weimer, Kirschfurt (DE); Hans-Joachim Fuchs, Dorfprozelton (DE)

(73) Assignee: Magna Donnelly GmbH & Co. KG (DE)

(*) Notice: Subject to any disclaimer, the term of this patent is extended or adjusted under 35 U.S.C. 154(b) by 82 days.

(21) Appl. No.: 11/113,902

(22) Filed: Apr. 25, 2005

(65) Prior Publication Data
US 2005/0248847 A1    Nov. 10, 2005

(30) Foreign Application Priority Data
May 5, 2004    (DE) ............. 10 2004 022 523

(51) Int. Cl.
*G02B 17/00* (2006.01)
*G02B 5/08* (2006.01)
(52) U.S. Cl. .............. 359/606; 359/604; 359/871
(58) Field of Classification Search ........ 359/601–614, 359/838–881
See application file for complete search history.

(56) References Cited

U.S. PATENT DOCUMENTS

| | | | | |
|---|---|---|---|---|
| 4,571,027 A | * | 2/1986 | Klein ..................... | 359/606 |
| 5,532,876 A | * | 7/1996 | Gauer et al. ............. | 359/604 |
| 5,745,310 A | * | 4/1998 | Mathieu .................. | 359/843 |
| 6,227,675 B1 | * | 5/2001 | Mertens et al. ........... | 359/871 |
| 6,329,925 B1 | * | 12/2001 | Skiver et al. ............ | 340/815.4 |

FOREIGN PATENT DOCUMENTS

| | | |
|---|---|---|
| DE | 30 41 692 A1 | 5/1981 |
| DE | 32 34 157 A1 | 3/1983 |
| DE | 31 47 281 A1 | 6/1983 |
| DE | 32 07 200 A1 | 9/1983 |
| DE | 34 37 775 C2 | 4/1986 |
| DE | 85 34 819.8 | 5/1986 |
| DE | 89 03 548.8 | 7/1989 |
| DE | 43 06 283 A1 | 10/1993 |
| EP | 0 202 757 | 11/1986 |
| EP | 0 208 008 | 1/1987 |
| EP | 0 228 580 A2 | 7/1987 |
| EP | 531 686 A1 * | 7/1992 ........... 359/606 |
| EP | 0 975 488 B1 | 2/2000 |

* cited by examiner

*Primary Examiner*—Thong Q Nguyen
(74) *Attorney, Agent, or Firm*—McGlew and Tuttle P.C (57) ABSTRACT

An interior mirror (01) for a motor vehicle having a carrier arm (06) which can be mounted in the vehicle and having an adjustment mechanism (04) which is adjustably mounted on the carrying arm (06), whereby a wedge mirror glass (03) is directly or indirectly mounted on the adjustment mechanism (04) and whereby the wedge mirror glass (03) is adjustable between a normal position and an anti-glare position by operation of the adjustment mechanism (04) and whereby a drive mechanism (05) is provided for operation of the adjustment mechanism (04). At least one elastic tension element (31) is provided in the interior mirror (01); with this tension element, the adjustment mechanism (04) is put under elastic tension in the normal position and/or in the anti-glare position.

15 Claims, 12 Drawing Sheets

INTERIOR MIRROR WITH A DRIVE MECHANISM FOR ADJUSTING A WEDGE MIRROR GLASS

CROSS REFERENCE TO RELATED APPLICATIONS

This application claims the benefit of priority under 35 U.S.C. § 119 of German Application DE 10 2004 022 523.0 filed May 5, 2004, the entire contents of which are incorporated herein by reference.

FIELD OF THE INVENTION

This invention relates to an interior mirror of a vehicle with a drive mechanism for adjusting a wedge mirror glass vehicle with a carrying arm which can be mounted in the vehicle and with an adjustment mechanism.

BACKGROUND OF THE INVENTION

Generic interior mirrors with wedge mirror glass are known from automotive engineering. The wedge mirror glass permits dimming of the interior mirror by making an adjustment between a normal position and a dimming or anti-glare position. This means that the degree of reflection of the wedge mirror glass is much lower in the anti-glare position, so that the driver is not blinded by the headlights of trailing vehicles when driving at night.

With most vehicles, the adjustment mechanism for adjusting the wedge mirror glass between the normal position and the anti-glare position is operated manually. This means that to adjust the wedge mirror glass, the driver must manually operate an operating element which is provided on the interior rear-view mirror, e.g., an adjusting lever or a turn knob.

In addition, DE 32 34 157 A1 and EP 0 208 008 B1 disclose generic interior mirrors for motor vehicles in which the adjustment of the wedge mirror glass is performed by means of electromechanical driving means. By controlling an electric motor, a mechanical speed-transforming gear is driven, whereby the speed-transforming gear is engaged with the wedge mirror glass in such a way that the wedge mirror glass can be adjusted between the normal position and the anti-glare position.

It is a disadvantage of the known interior mirrors having a drive mechanism for adjusting the wedge mirror glass that they are extremely sensitive to vibration. Thus, the vibrations caused by the drive engine of the vehicle is transmitted to the wedge mirror glass and causes interfering vibrational movements there because of the play in the bearing in the drive train and/or due to manufacturing tolerances. The vibrational movements of the wedge mirror glass may result in a blurred image of the following traffic.

SUMMARY OF THE INVENTION

Based on this state of the art, the object of the present invention is therefore to propose a novel automotive interior rear-view mirror which avoids the disadvantages known from the state of the art.

An advantage of the inventive interior mirror includes in particular the fact that an elastic tension element, with which the adjustment mechanism is under elastic tension in the normal position and/or in the anti-glare position, is provided. This elastic pre-tension on the adjustment mechanism prevents the vibrations of the vehicle from being transmitted to the wedge mirror glass to an unacceptable extent. If there is some play in the bearing due to the manufacturing tolerance, e.g., in the drive train of the drive mechanism for driving the adjustment mechanism, this bearing play is eliminated by the elastic pre-tension in the normal position and/or in the anti-glare position.

Essentially it does not matter how the tension element is designed as long as adequate bracing of the adjustment mechanism is ensured. Especially simple and inexpensive embodiments are obtained when a spring element is used as a tension element. Such spring elements, e.g., helical springs or spiral springs, can apply the elastic tension within certain load limits for an unlimited period of time and are also available very inexpensively.

This invention is explained in greater detail below on the basis of the exemplary embodiments depicted in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
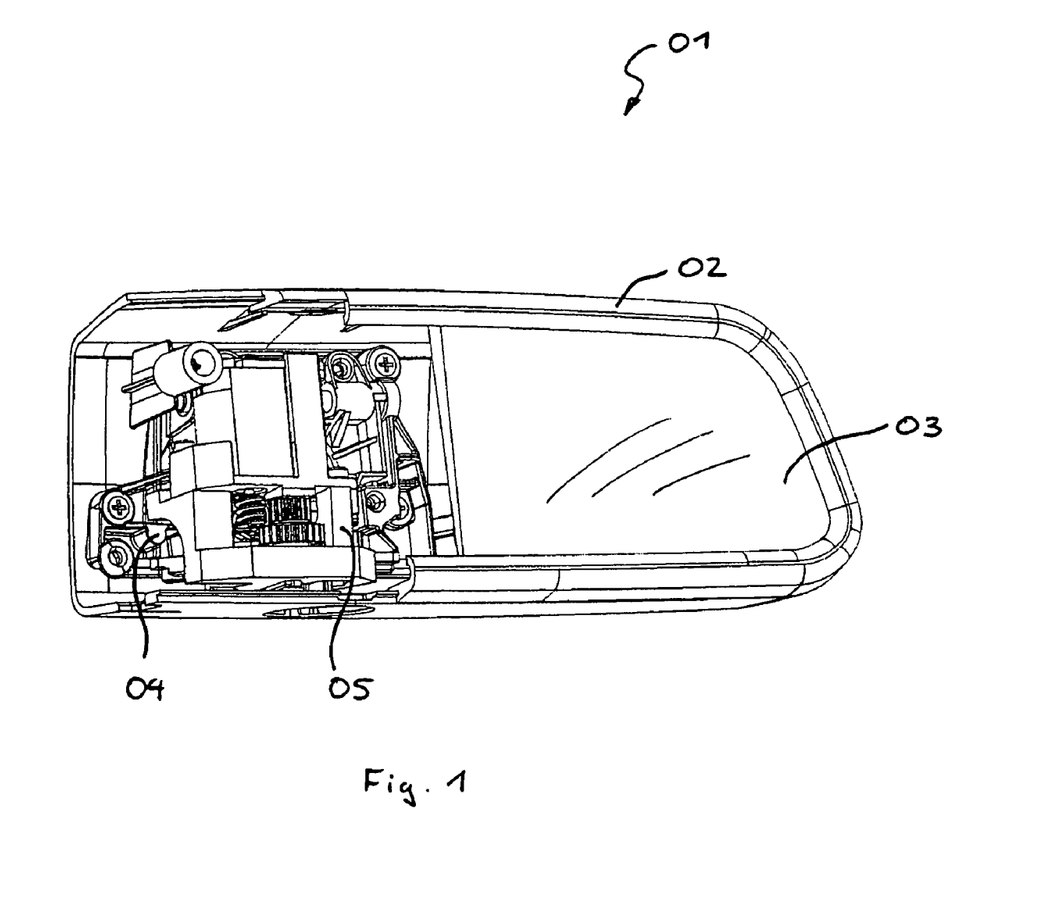
FIG. 1 is a cutaway perspective view showing the design of an interior rear-view mirror with a wedge mirror glass.

Referring to the drawings in particular, FIG. 1 shows an interior mirror 01 having a housing 02 and a wedge mirror glass 03 mounted on it, shown in a perspective view. An adjustment mechanism 04 having a drive mechanism 05 mounted on it is accommodated in the hollow space between the housing 02 and the wedge mirror glass 03. A swivel bearing is implemented in the adjustment mechanism 04, so that a swiveling movement of the housing 02 about an angle defined by the wedge angle of the wedge mirror glass 03 is implemented by the mounting of the adjustment mechanism 04 on a carrying arm 06 (see FIG. 2). Thus as a result, by operation of the adjustment mechanism 04, the wedge mirror glass 03 rigidly mounted on the housing 02 can be pivoted by this angle in relation to the carrying arm 06 so that the wedge mirror glass is adjusted between the normal position and the anti-glare position or vice versa.

Figure 2:
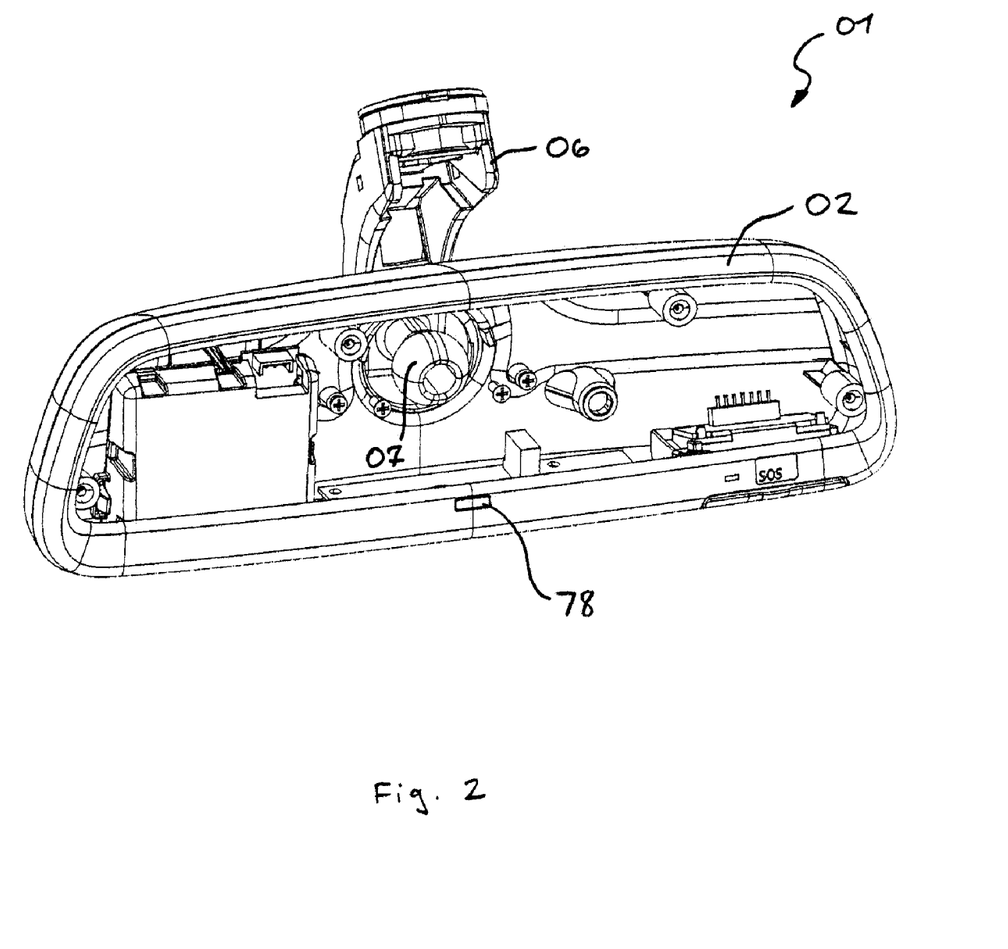
FIG. 2 is a perspective view showing the housing and the carrying arm of the interior rearview mirror according to FIG. 1.

FIG. 2 shows the housing 02 of the interior mirror 01 and the carrying arm 06 which is used for mounting the interior rear-view mirror 01 in the vehicle. A ball head 07 is provided on the end of the carrying arm 06 which is pointing toward the housing 02; this ball head is engaged in a ball socket 08 (see FIG. 3) of the adjustment mechanism 04 so that it is complementary in function. By swiveling the ball socket 08 in relation to the ball head 07, the driver can adjust the housing 02 to his or her head position with the wedge mirror glass 03 mounted rigidly on it.

Figure 3:
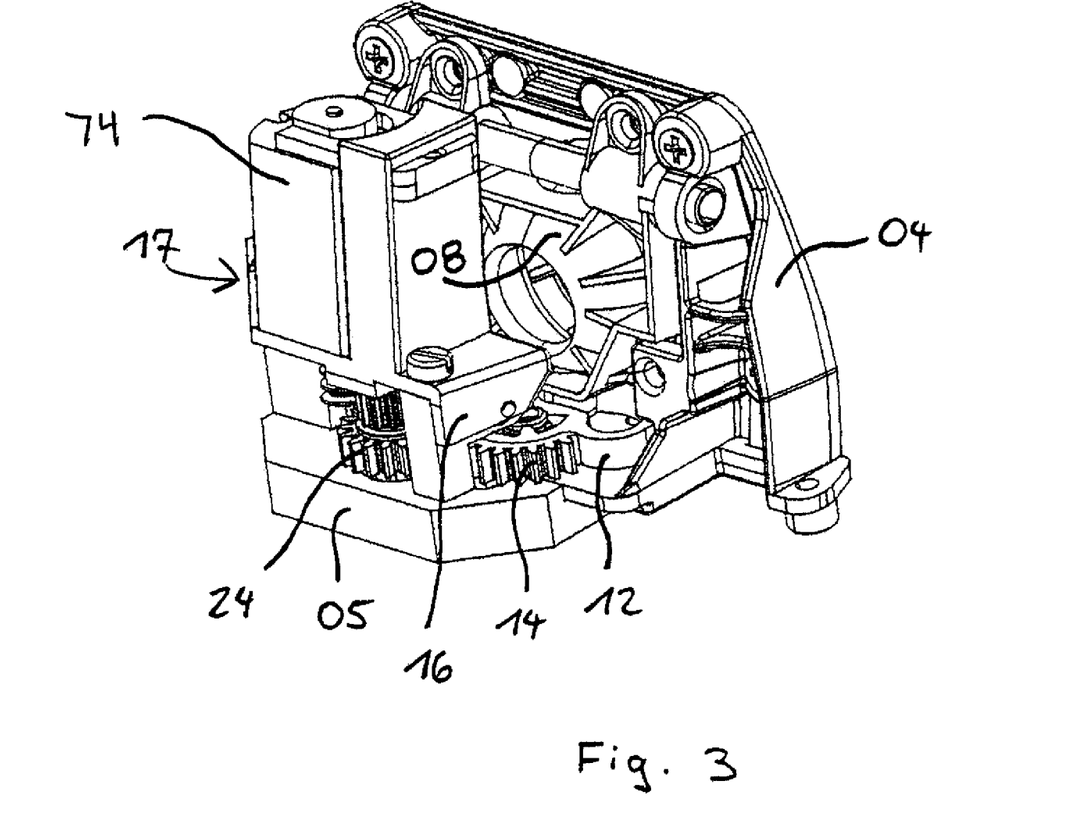
FIG. 3 is a perspective view showing the adjustment mechanism with the drive mechanism of the interior rear-view mirror according to FIG. 1 attached to it.

FIG. 3 shows in a perspective view the adjustment mechanism 04 with the drive mechanism 05 mounted on it.

Figure 4:
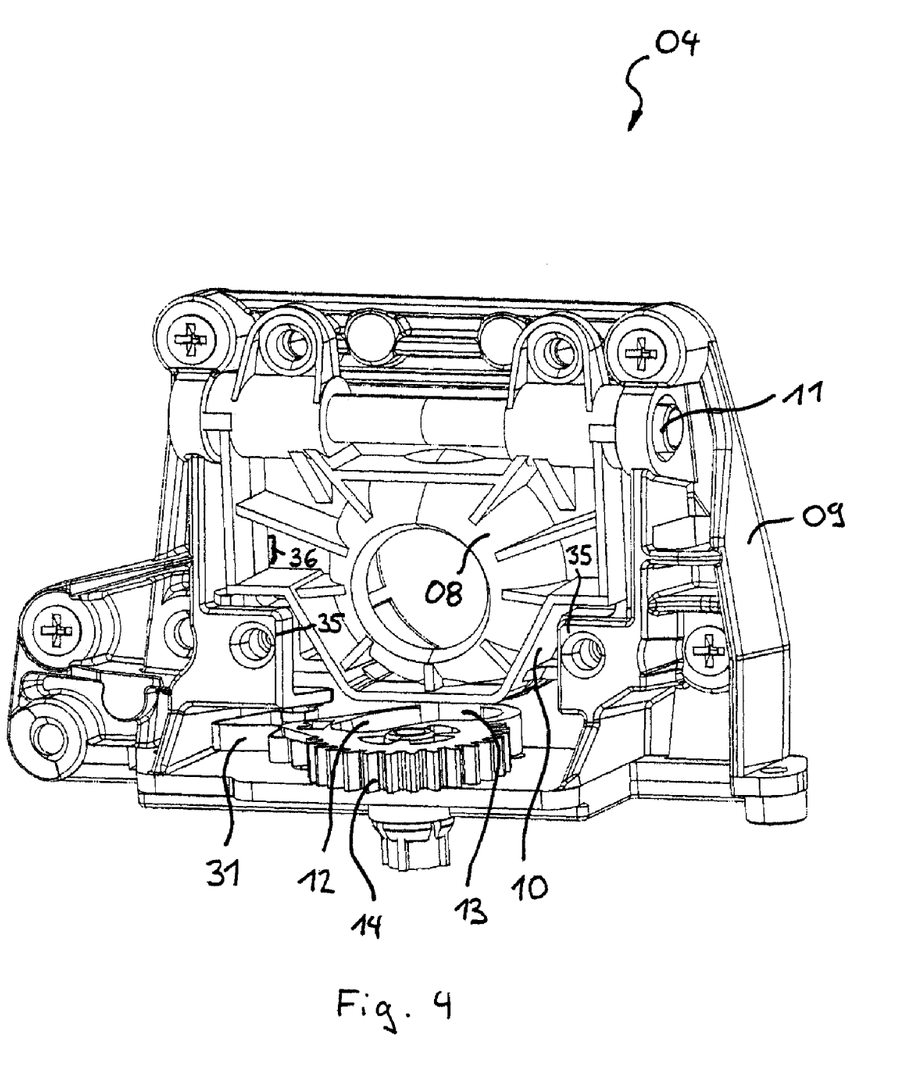
FIG. 4 is a perspective view showing the adjustment mechanism of the interior rear-view mirror according to FIG. 1.

FIG. 4 shows the adjustment mechanism 04 as an individual part in an enlarged perspective view. The adjustment mechanism 04 consists essentially of two parts 09 and 10 which are pivotably joined together by means of a swivel axis 11. The first part 09 of the adjustment mechanism 04 is rigidly connected to the housing 02 by means of suitable fastening means, e.g., screws. The second part 10 of the adjustment mechanism 04 is mounted on the ball head 07 of the carrying arm 06 by means of the ball socket 08. As a result, by swiveling the first part 09 of the adjustment mechanism 04 in relation to the second part 10 of the adjustment mechanism 04, the swiveling movement required for adjustment of the wedge mirror glass 03 can be implemented according to the wedge angle of the wedge mirror glass 03. Two projections are integrally molded on the first part 09 and together they serve as the first end stop 35 in the adjustment of the second part 10. Two other projections are integrally molded on the first part 09 partially concealed in FIG. 4) on the opposite side of the second part 10; together they function as the second end stop 36 in the adjustment of the second part 10.

The drive of the second part 10 in relation to the first part 09 of the adjustment mechanism 04 is implemented by a cam plate 12. The second part 10 of the adjustment mechanism 04 is engaged with the cam plate 12 by means of a guide pin 13. Depending on the adjustment angle of the cam plate 12, the guide pin 13 is displaced forward or to the rear and the second part 10 of the adjustment mechanism 04 is pivoted accordingly in relation to the first part 09. For the drive of the cam plate 12 by means of the drive mechanism 05, a spur gear 14 is provided on the front side of the cam plate 12. To be able to optionally implement the interior mirror 01 even without the drive mechanism 05 when using the adjustment mechanism 04, e.g., when the drive mechanism 05 is to be installed only as a special equipment feature option, a coupling element is provided on the lower side of the cam plate 12, and then a manually operated adjustment element, e.g., a turn knob, may optionally be mounted on this coupling element. This provides a manual adjustment option.

Figure 5:
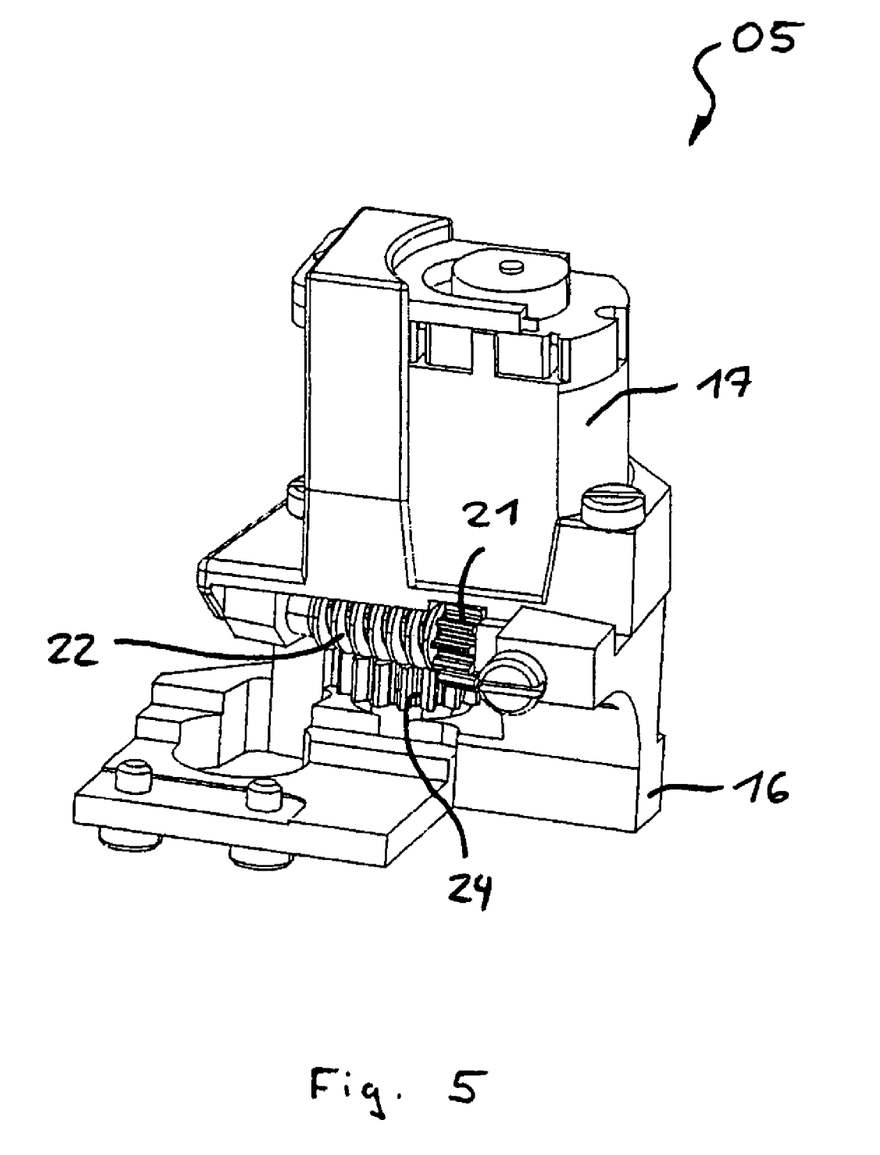
FIG. 5 is a perspective view showing the drive mechanism of the interior rear-view mirror according to FIG. 1.

FIG. 5 shows the drive mechanism 05 as an individual part. The drive mechanism 05 is mounted on the whole on a carrier element 16 and can easily be implemented as a special equipment feature of the interior mirror 01 by mounting the carrier element 16 as a pre-assembled component on the adjustment mechanism 04. The adjusting movement required for adjusting the adjustment mechanism 04 is created by an electric drive motor 17. This driving movement is transmitted to the spur gear 14 of the cam plate 12 by means of a drive train which is designed in the manner of a mechanical speed-transforming gear.

Figure 6:
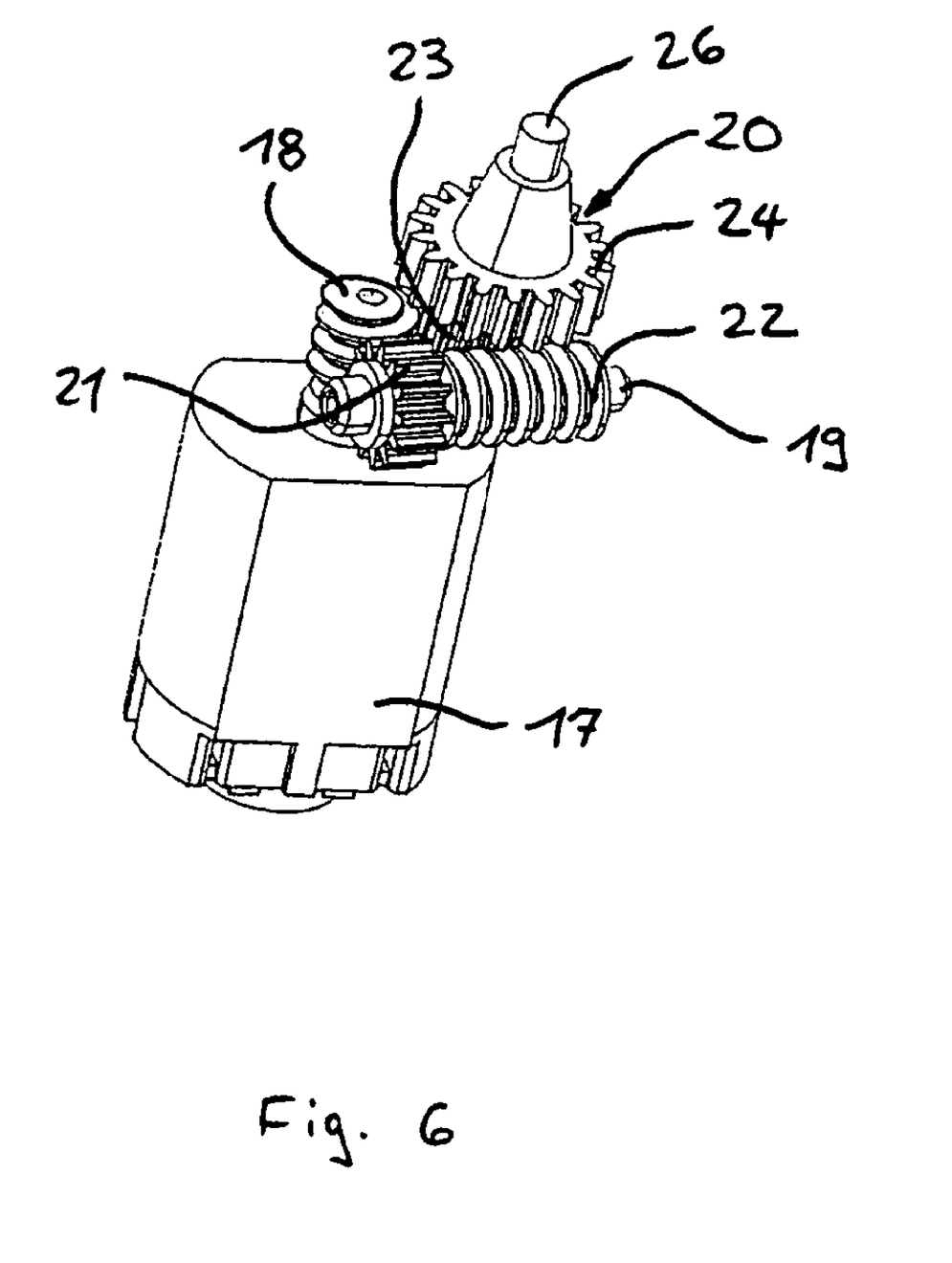
FIG. 6 is a perspective view showing the drive motor with a mechanical speed-transforming gear of the drive mechanism according to FIG. 5.

FIG. 6 shows the design of the drive train with the drive motor 17, the output screw 18 between the shaft 19 and the free-wheeling device 20. The output screw 18 drives a screw gear 21 integrally molded on the intermediate shaft 19 when the drive motor 17 is driven. The screw gear 21 of the intermediate shaft 19 is rigidly connected to the drive screw 22 which in turn drives a screw gear 23 (shown as concealed in FIG. 6). The screw gear 23 together with a spur gear 24 forms a free-wheeling device, whereby the spur gear 24 and the screw gear 23 are engaged by means of a claw clutch 25 (see FIG. 7).

Figure 7:
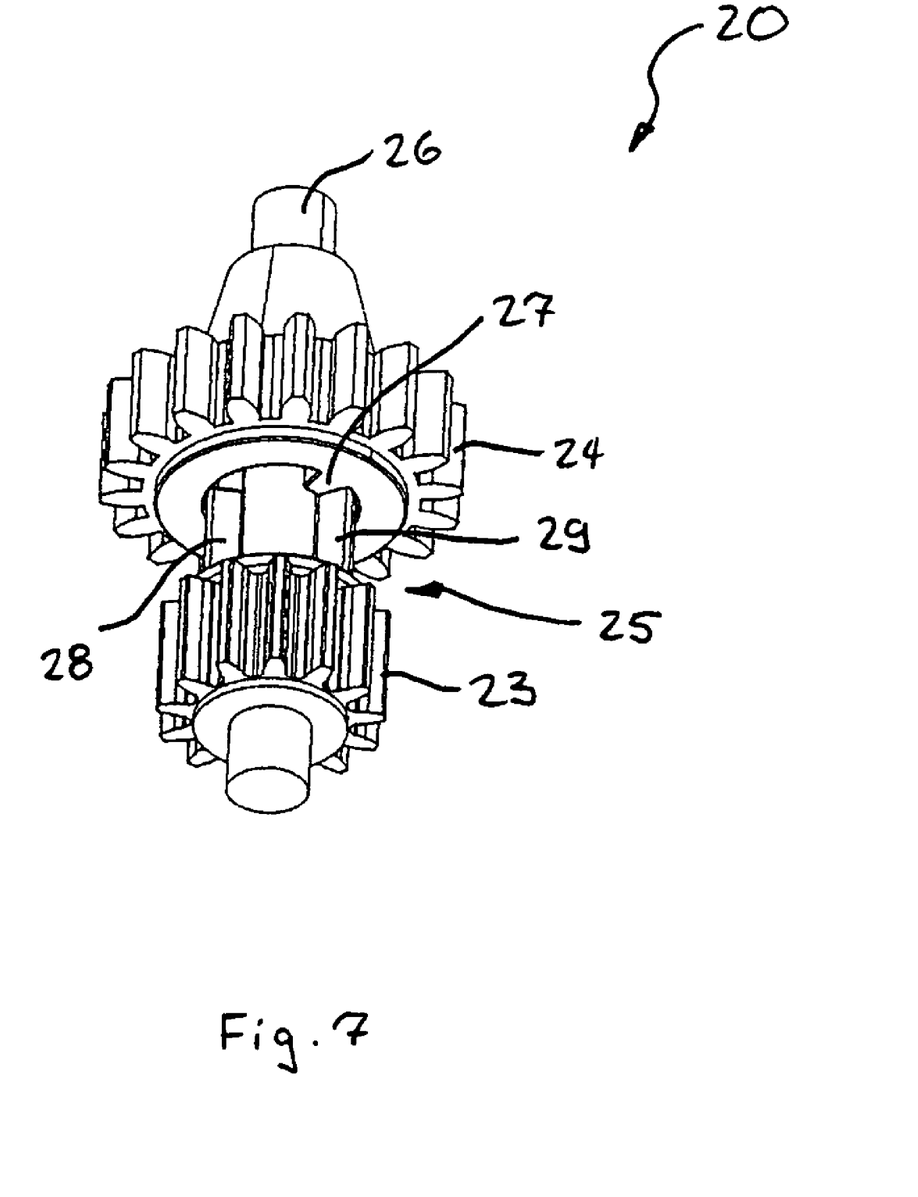
FIG. 7 is a perspective view showing the free-wheeling coupling of the drive mechanism according to FIG. 5.

FIG. 7 shows the function of the free-wheeling device 20 diagramed schematically, with the free-wheeling device 20 being shown in the disengaged position in FIG. 7. The screw gear 23 is rigidly connected to a shaft 26 on which the spur gear 24 is rotatably mounted. A claw 27 is integrally molded on the inside of the spur gear 24 so that it engages with two claws 28 and 29 which are integrally molded on the shaft 26. When the screw gear 23 is driven counter-clockwise, the claw 27 comes to rest against the claw 29, so that the spur gear 24 is entrained by the screw gear 23. When the screw gear 23 is driven in the clockwise direction, however, the claw 27 comes to rest against the claw 28, so that the spur gear 24 is entrained in the opposite direction. Due to the actuator travel of the claw 27 between the two claws 28 and 29, a freewheeling effect is implemented along a certain control angle between the screw gear 23 and the spur gear 24.

Figure 8:
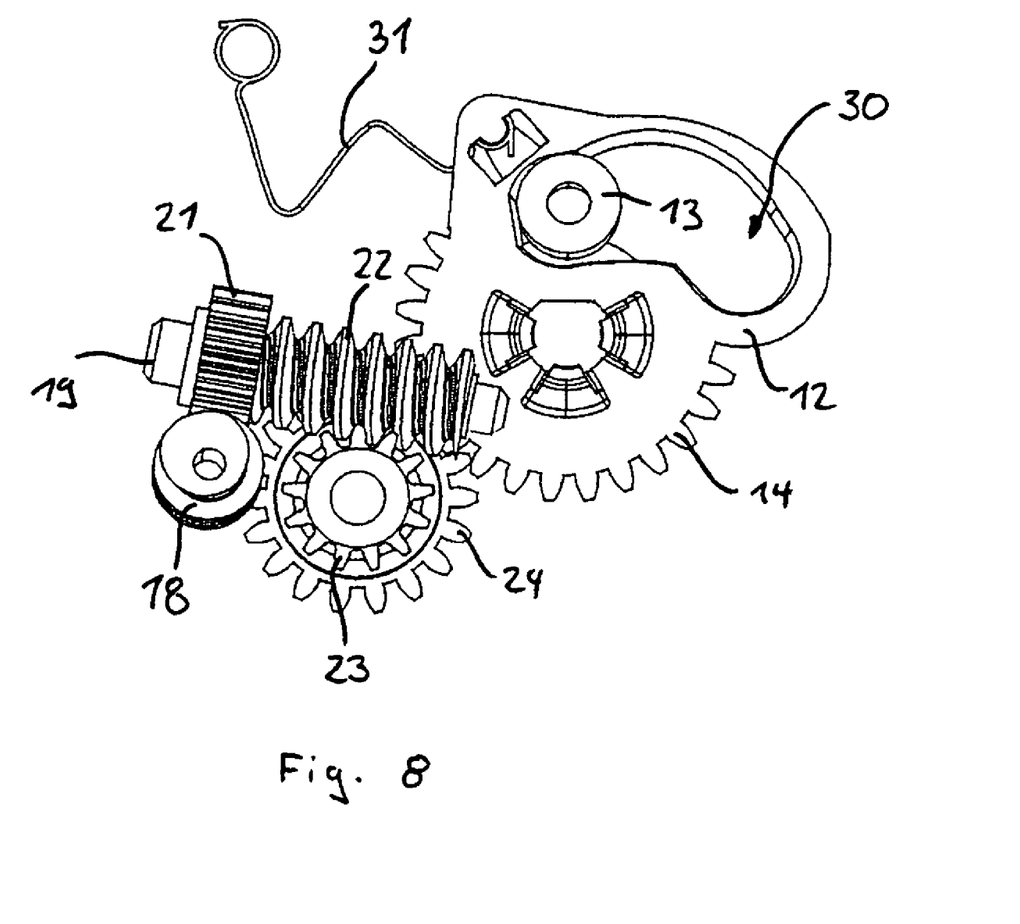
FIG. 8 is a view showing the drive train of the interior rear-view mirror according to FIG. 1 in the normal position of the wedge mirror glass.
Figure 9:
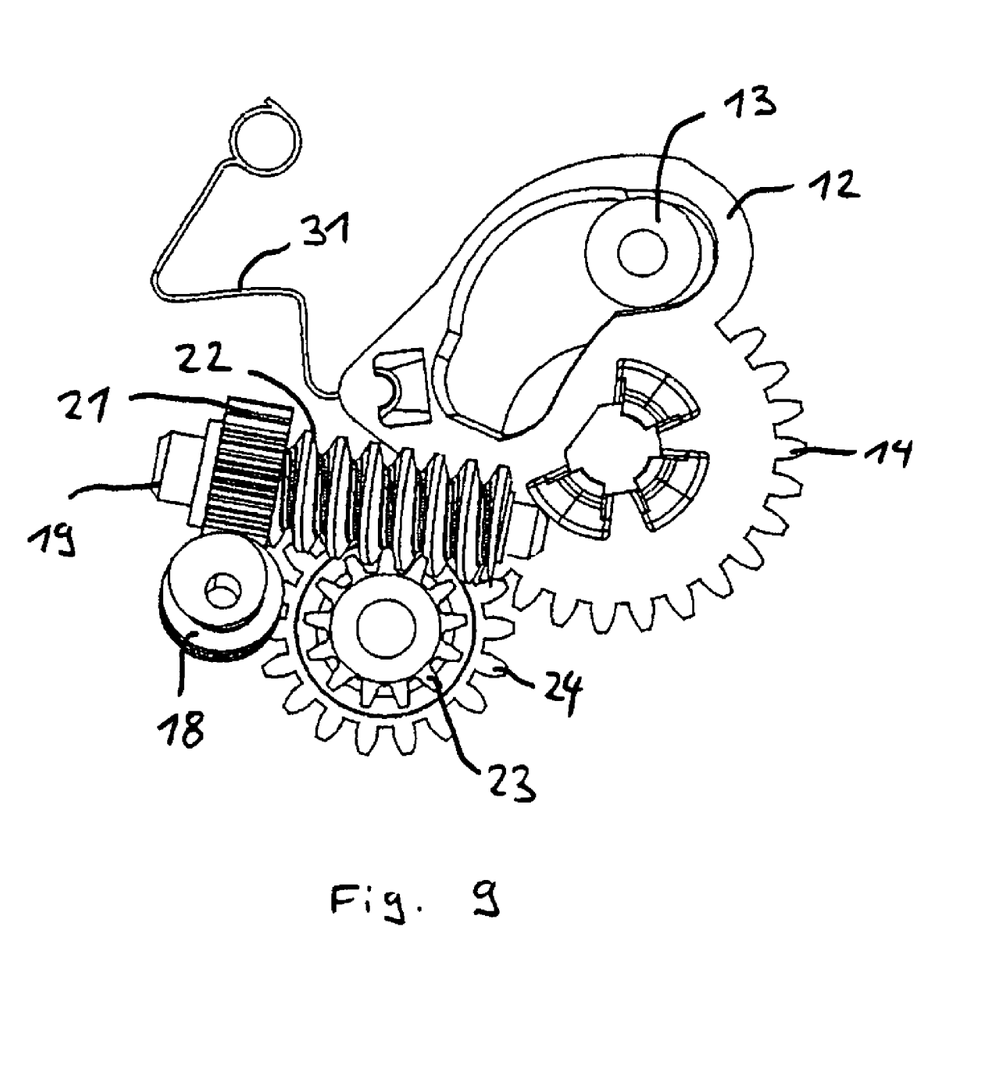
FIG. 9 is a view showing the drive train of the interior rear-view mirror according to FIG. 1 in the anti-glare position of the wedge mirror glass.

FIG. 8 and FIG. 9 illustrate the functioning of the drive train for adjustment of the wedge mirror glass in the interior mirror 01. FIG. 8 shows the drive train with the wedge mirror glass 03 arranged in the normal position, whereas FIG. 9 shows the drive train with the wedge mirror glass 03 in the anti-glare position. The guide pin 13 which protrudes on the second part 10 of the adjustment mechanism 04 is guided in the guide groove 30.

In addition to the drive mechanism 05, a torsion spring is also engaged with the cam plate 12. One end of the torsion spring 31 is rotatably mounted in the adjustment mechanism 04 (see FIG. 4). The torsion spring 31 causes the cam plate 12 to be under elastic pre-tension in the two end positions of the guide pin 13 in the guide groove 30.

When the wedge mirror glass 03 is adjusted out of the normal position into the anti-glare position and/or vice versa from the anti-glare position into the normal position, the procedure is as follows. First the drive motor 17 is driven by a suitable operating element, e.g., a switch on the steering wheel or a light-sensitive sensor and then the output screw gear 18 is set in rotation. This causes the intermediate shaft 19 to also be set in rotation and the drive movement is transmitted via the free-wheeling device 20 to the spur gear 14 of the cam plate 12. According to the adjustment angle of the cam plate 12, the guide pin 13 is shifted forward or to the rear and the second part 10 of the adjustment mechanism 04 is thus pivoted in relation to the first part 09. The spring force applied by the torsion spring 31 increases continuously with an adjustment in the cam plate 12 until reaching a dead center at which the direction of force of the torsion spring 31 has reached a reversal point due to its special design.

As soon as this reversal point has been reached, the tension force of the torsion spring 31 acts in the opposite direction, pressing the cam plate 12 in the direction of the opposite end stop 35 or 36. The tension force supplied by the torsion spring 31 causes an intermediate pivoting movement of the adjustment mechanism 04 in the direction of the end stop 35 or 36, whereby the adjustment mechanism 04 is uncoupled from the drive mechanism 05 due to the freewheeling device 20 in this area of the actuator travel and thus the swiveling motion is not hindered in the second section of the actuator travel. As soon as the part 10 has reached the end stop 35 or 36 (see FIG. 4), the pivotable bearing of the housing 02 is under elastic pre-tension by the torsion spring 31.

Figure 10:
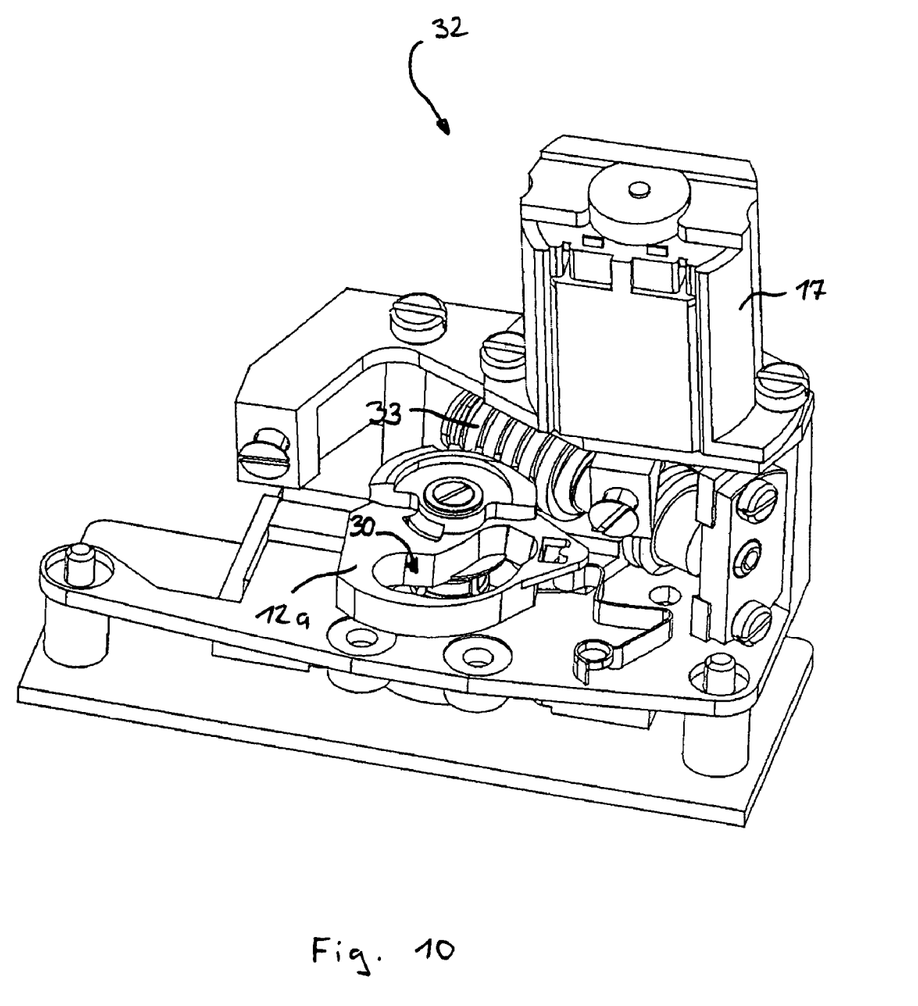
FIG. 10 is a perspective view showing a second embodiment of a drive mechanism for use in an interior rear-view mirror according to FIG. 1 in a perspective view.
Figure 11:
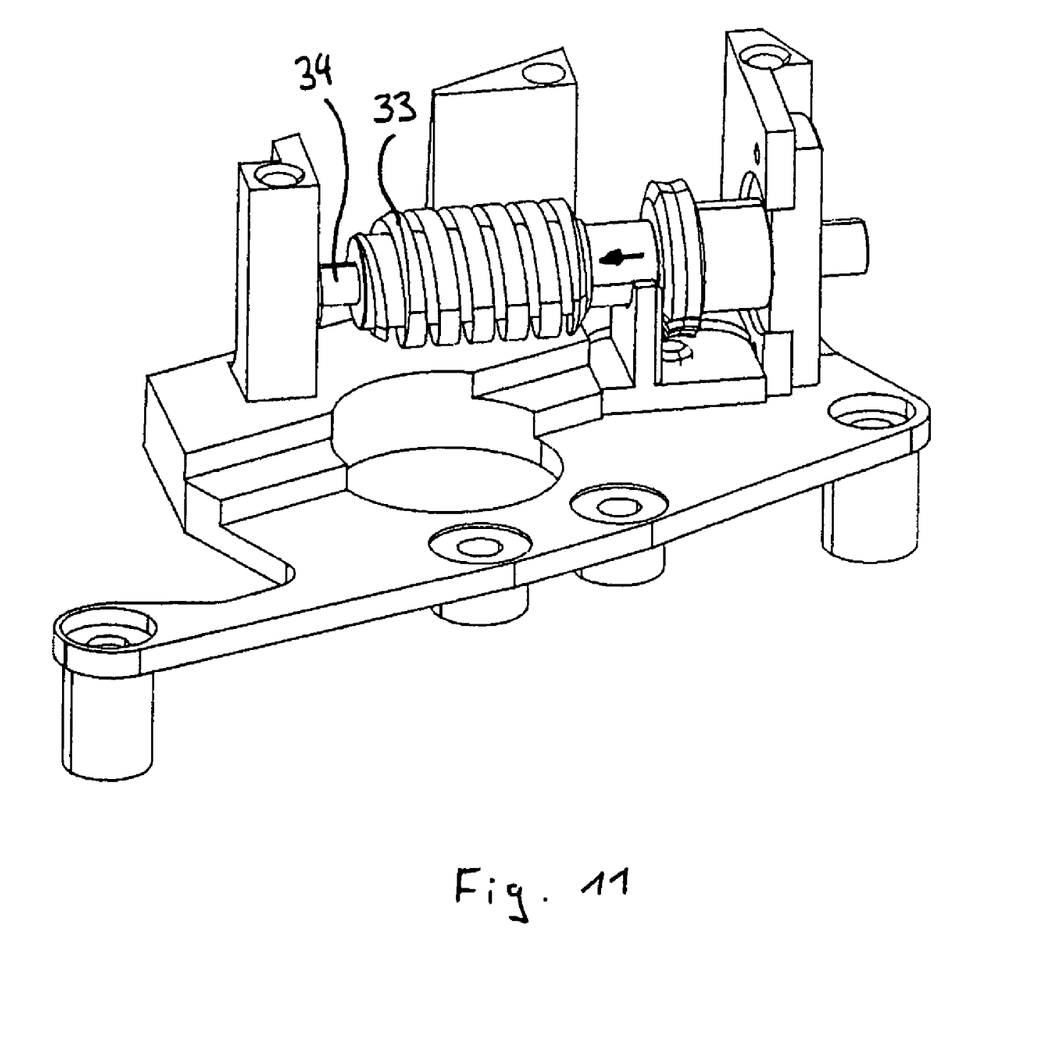
FIG. 11 is a perspective view showing the drive screw of the drive mechanism according to FIG. 10 with the wedge mirror glass arranged in the normal position.
Figure 12:
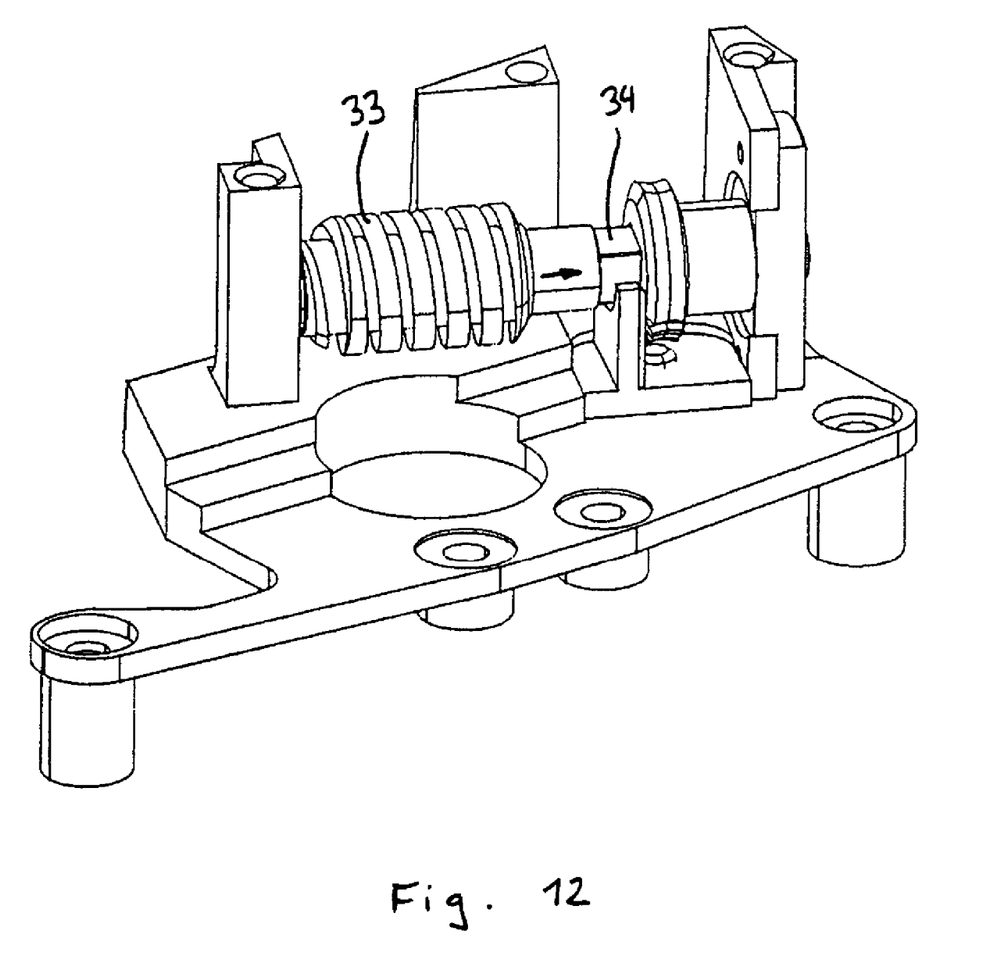
FIG. 12 is a perspective view showing the drive screw of the drive mechanism according to FIG. 10 when the wedge mirror glass is arranged in the antiglare position.

In FIG. 10 through FIG. 12, a second embodiment 32 of a drive mechanism which is fundamentally suitable for the interior mirror 01 is depicted. With the drive mechanism 32, the control movement is transmitted via a drive screw 33 to the cam plate 12*a* which is designed in the manner of a screw gear on one side for this reason. The drive screw 33 is in turn axially displaceable on a drive shaft 34 which can be driven to rotate by a drive motor 17. As shown in FIG. 11 and FIG. 12, the drive screw 33 can be displaced axially between two end stops on the drive shaft 34. Due to this axial displaceability of the drive screw 33, the free-wheeling function in the drive train is implemented for driving the cam plate 12*a* As soon as the dead center of the torsion spring 31 has been passed in the drive of the cam plate 12*a*, the cam plate 12*a* is forced is forced in the direction of the opposite end stop having been driven by the spring force of the torsion spring 31 and in doing so the drive screw 33 is shifted from the end stop with which it is in contact in the direction of the opposite end stop.

According to a preferred embodiment, the spring element is designed in the manner of a torsion spring or a bracing spring. This type of spring has two legs bent at an angle to one another and they are engaged with the adjustment mechanism in such a way that the torsion spring or bracing spring puts the adjustment mechanism under elastic tension in both the normal position and the anti-glare position. Therefore, in this way only one spring element is required for bracing the adjustment mechanism in its two functional positions, thereby achieving a further cost reduction.

In addition, it is particularly advantageous if the normal position and/or the anti-glare position is defined by a first end stop and/or a second end stop and if the tension element braces the adjustment mechanism against the first and/or second end stop. This ensures that the wedge mirror glass will assume precisely defined angular positions in its two functional positions.

Essentially any type of drive motor may be used in the drive mechanism. This invention can be implemented especially easily and inexpensively when using electric drive motors.

To be able to transmit the adjusting movement of the drive motor to the adjustment mechanism in a suitable manner, it is especially advantageous if a mechanical drive is provided in the drive mechanism for translating or reducing the adjusting movement of the drive motor.

It is basically sufficient for implementation of the present invention if the tension force of the tension element acts on the adjustment mechanism only in the two function positions of the wedge mirror glass. To be able to support the adjustment of the adjustment mechanism along the actuator travel between the two function positions, however, it is especially advantageous if the tension force of the tension element acts on the adjustment mechanism along the total actuator travel. The tension element here must be designed and arranged in such a way that the tension force changes the direction of force at a dead center between the normal position and the anti-glare position on the actuator travel. This achieves the result that the tension element then drives the adjustment mechanism in the direction of the normal position in a first section of the actuator travel, whereas in a second section of the actuator travel, the tension force is exerted in the direction of the anti-glare position.

When the tension force of the tension element is exerted on the adjustment mechanism along the entire path of actuator travel a considerable shortening of the switching time of the wedge mirror glass between the normal position and the anti-glare position and vice versa can be achieved by installing a free-wheeling device in the drive train of the drive mechanism. Due to this free-wheeling mechanism, the adjustment of the adjustment mechanism is separated from the adjustment of the drive mechanism, depending on the particular reference point in the actuator travel. As a result, it is then possible for the adjustment mechanism to be driven by driving the drive mechanism from one function position, e.g., the normal position, into the other function position only along the first section of the actuator travel until reaching the dead center. As soon as the dead center has been passed, the tension force of the tension spring acts on the adjustment mechanism and moves the adjustment mechanism further until reaching the second function position, e.g., the anti-glare position. Because of the decoupling between the drive mechanism and the adjustment mechanism due to the free-wheeling mechanism, this ensures that the adjusting movement induced by the tension element is not hindered.

Essentially the embodiment of the free-wheeling device with regard to its design does not matter. For example, claw clutches or slip clutches have proven suitable for implementation of such a decoupling between the drive mechanism and the adjustment mechanism. As an alternative to using claw clutches or slip clutches, a drive worm gear mounted to be axially displaceable on a drive shaft between two stop elements may also be used.

Since with mirrors according to this invention, fixation of the wedge mirror glass in the two function positions is also ensured by the elastic tension element independently of the electric drive mechanism, it is especially advantageous when the drive mechanism is mounted on a carrier element, which can in turn be mounted with coupling to the drive train of the adjustment mechanism as a special equipment element. As a result, different interior mirror variants can thus be produced easily. In the first variant, the carrier element is not mounted with the drive mechanism, and instead a suitable operating element, e.g., a control lever or turn knob, is mounted for driving the adjustment mechanism. If a corresponding special equipment element has been ordered for a vehicle variant, then the carrier element is mounted with the drive mechanism in the interior mirror so that a motor adjustment capability is achieved without having to make any major changes in the structural design of the interior mirror.

Different variants are conceivable for controlling the drive mechanism of the interior rear-view mirror. According to a first preferred variant, a light-sensitive sensor, in particular a differential light sensor, is provided and may itself be mounted inside the rear-view mirror, for example. As soon as this light sensor detects glare due to the trailing traffic above a certain tolerance threshold, the drive mechanism is triggered accordingly and the wedge mirror glass is adjusted to the antiglare position. As soon as the light has fallen below a certain glare threshold again, the wedge mirror glass is then automatically adjusted back to the normal position.

As an alternative and/or in addition to triggering the drive mechanism with a light-sensitive sensor, a driver operable switch element 78 may also be provided for controlling the drive mechanism. By operating this switch element, e.g., by pushing on a button, the driver can adjust the wedge mirror glass between the anti-glare position and the normal position or vice versa.

According to a preferred embodiment, the switch element can be operated in a non-contact manner for operation of the drive mechanism Therefore, embodiments in which the driver's hand just approaches the switch element, which may be installed in the interior rear-view mirror, for example, are also conceivable, in which case when the distance between the driver's hand and the switch element falls below a certain minimum, the wedge mirror glass is automatically switched between the anti-glare position and the normal position or vice versa.

In addition, it is also advantageous if the switch element for triggering the drive mechanism is arranged on the steering wheel of the motor vehicle. This permits an adjustment of the wedge mirror glass between its two function positions by operation of the switch element without the driver having to remove his hands from the steering wheel.

Essentially it does not matter how the drive mechanism is turned off after reaching the anti-glare position and/or the normal position. For example, limit switches or distance measurement devices may be installed in the rear-view mirror for this purpose, in which case the drive mechanism is turned off when the end switch is triggered and/or when a certain adjustment distance is exceeded. The shutdown of the drive mechanism can be implemented especially easily and inexpensively when a timing element 74 is provided in the drive mechanism A certain time for which the drive mechanism is driven in a certain direction after being triggered is predefined in this timing element. After this predetermined period of time has elapsed, the timing element automatically shuts down the drive mechanism.

While specific embodiments of the invention have been shown and described in detail to illustrate the application of the principles of the invention, it will be understood that the invention may be embodied otherwise without departing from such principles.

What is claimed is:

1. An interior mirror for a vehicle, the interior mirror comprising:
   a carrying arm which can be mounted in the vehicle;
   an adjustment mechanism which is adjustably mounted on the carrying arm;
   a wedge mirror glass directly or indirectly mounted on the adjustment mechanism, the wedge mirror glass being adjustable between a normal position and an anti-glare position by operation of the adjustment mechanism;
   elastic tension element in the interior mirror, the elastic tension element placing the adjustment mechanism under elastic tension in the normal position and/or in the anti-glare position; and
   a drive mechanism provided for operation of said adjustment mechanism, said drive mechanism comprising a mechanical gear, wherein a free-wheeling device within said gear uncouples said adjustment mechanism from said drive mechanism, whereby said elastic tension drives said adjustment mechanism independently of the adjustment of the drive mechanism after said adjustment mechanism passes a dead center located along an actuator travel path.

2. The interior mirror according to claim 1, wherein the tension element is formed by a spring element.

3. The interior mirror according to claim 2, wherein the spring element is designed in the manner of a torsion spring or a bracing spring.

4. The interior mirror according to claim 1, wherein the normal position is defined by a first end stop and the anti-glare position as defined by a second end stop whereby the tension element puts the adjustment mechanism under tension against the first end stop or the second end stop.

5. The interior mirror according to claim 1, wherein the drive mechanism comprises an electric drive motor.

6. The interior mirror according to claim 1, wherein the tension element exerts a tension force on the adjustment mechanism along the entire actuator travel of the adjustment mechanism between the normal position and the anti-glare position, whereby the tension force of the tension element changes the direction of force at a dead center which is located along the actuator travel path between the normal position and the anti-glare position.

7. The interior mirror according to claim 1, wherein the drive mechanism is mounted on a carrier element which can be mounted as a separate special equipment element with coupling to a gear of the adjustment mechanism.

8. The interior mirror according to claim 1, wherein the drive mechanism is triggered by a switch element which can be operated by the driver of the vehicle.

9. The interior mirror according to claim 1, wherein a switch element can be operated by a non-contact method.

10. The interior mirror according to claim 1, wherein a switch element is arranged on the interior mirror.

11. The interior mirror according to claim 1, wherein a switch element is arranged on the steering wheel of the vehicle.

12. An interior mirror for a vehicle, the interior mirror comprising:
    a carrying arm which can be mounted in the vehicle;
    an adjustment mechanism which is adjustably mounted on the carrying arm;
    a wedge mirror glass directly or indirectly mounted on the adjustment mechanism, the wedge mirror glass being adjustable between a normal position and an anti-glare position by operation of the adjustment mechanism;
    elastic tension element in the interior mirror, the elastic tension element placing the adjustment mechanism under elastic tension in the normal position and/or in the anti-glare position; and
    a drive mechanism provided for operation of said adjustment mechanism, said drive mechanism comprising a mechanical gear, wherein a free-wheeling device within said gear uncouples said adjustment mechanism from said drive mechanism, whereby said elastic tension drives said adjustment mechanism independently of the adjustment of the drive mechanism after said adjustment mechanism passes a dead center located along an actuator travel path, said free-wheeling device being designed as a claw clutch.

13. An interior mirror for a vehicle, the interior mirror comprising:
    a carrying arm which can be mounted in the vehicle;
    an adjustment mechanism which is adjustably mounted on the carrying arm;
    a wedge mirror glass directly or indirectly mounted on the adjustment mechanism, the wedge mirror glass being adjustable between a normal position and an anti-glare position by operation of the adjustment mechanism;

elastic tension element in the interior mirror, the elastic tension element placing the adjustment mechanism under elastic tension in the normal position and/or in the anti-glare position; and a drive mechanism provided for operation of said adjustment mechanism, said drive mechanism comprising a mechanical gear, wherein a free-wheeling device within said gear uncouples said adjustment mechanism from said drive mechanism, whereby said elastic tension drives said adjustment mechanism independently of the adjustment of the drive mechanism after said adjustment mechanism passes a dead center located along an actuator travel path, said free-wheeling device being designed as a slip clutch.

14. An interior mirror for a vehicle, the interior mirror comprising:

a carrying arm which can be mounted in the vehicle;

an adjustment mechanism which is adjustably mounted on the carrying arm;

a wedge mirror glass directly or indirectly mounted on the adjustment mechanism, the wedge mirror glass being adjustable between a normal position and an anti-glare position by operation of the adjustment mechanism;

elastic tension element in the interior mirror, the elastic tension element placing the adjustment mechanism under elastic tension in the normal position and/or in the anti-glare position; and a drive mechanism provided for operation of said adjustment mechanism, said drive mechanism comprising a mechanical gear, wherein a free-wheeling device within said gear uncouples said adjustment mechanism from said drive mechanism, whereby said elastic tension drives said adjustment mechanism independently of the adjustment of the drive mechanism after said adjustment mechanism passes a dead center located along an actuator travel path, said free-wheeling device being formed by a drive screw mounted such that said free-wheeling device is axially displaceable on a drive shaft between two stop elements.

15. An interior mirror for a vehicle, the interior mirror comprising:

a carrying arm which can be mounted in the vehicle;

an adjustment mechanism which is adjustably mounted on the carrying arm;

a wedge mirror glass directly or indirectly mounted on the adjustment mechanism, the wedge mirror glass being adjustable between a normal position and an anti-glare position by operation of the adjustment mechanism;

a drive mechanism provided for operation of the adjustment mechanism, said drive mechanism comprising a timing element, whereby said timing element shuts down said drive mechanism for a certain period of time after triggering said drive mechanism; and elastic tension element in the interior mirror, the elastic tension element placing the adjustment mechanism under elastic tension in the normal position and/or in the anti-glare position.

* * * * *